May 18, 1937.  F. KESSELRING ET AL  2,080,612
CIRCUIT BREAKER
Filed Feb. 2, 1934    2 Sheets-Sheet 1
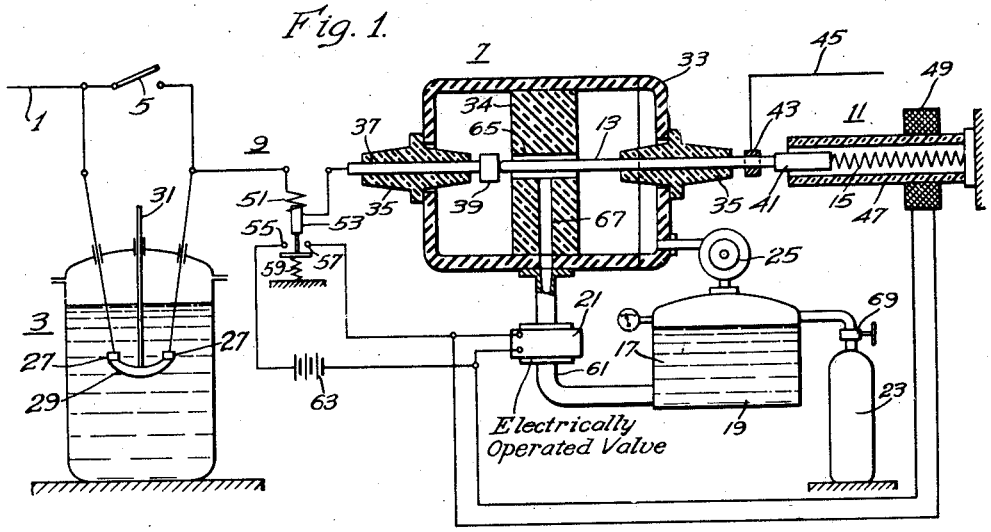
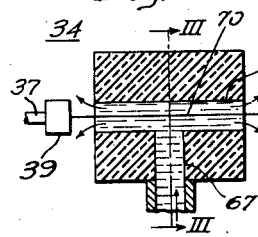
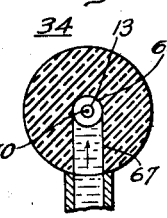
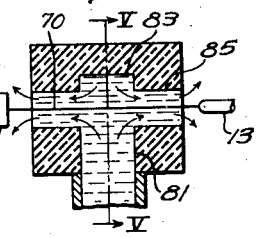
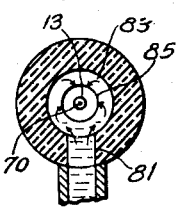
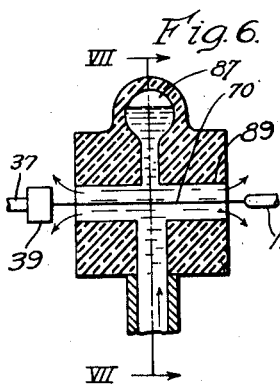
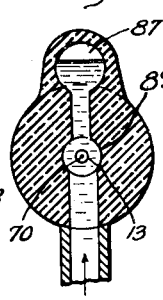
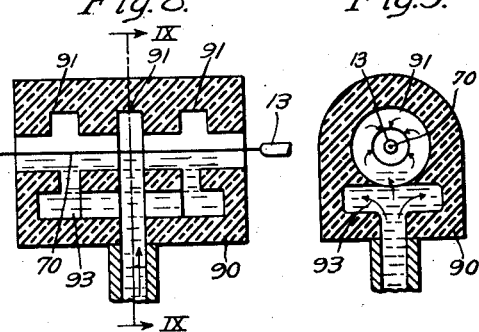
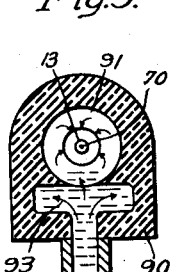
WITNESSES:
INVENTORS.
Fritz Kesselring, Floris Koppelmann
and Werner Kaufmann.
BY
ATTORNEY

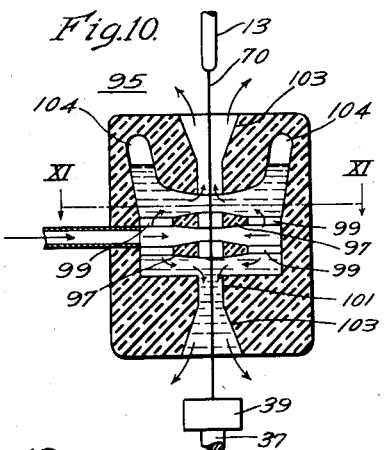
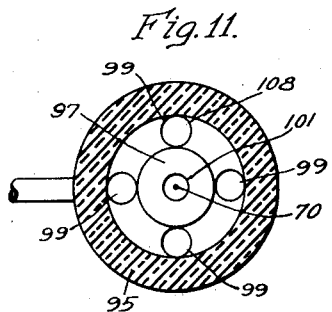
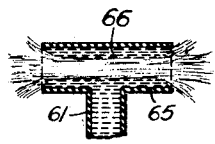
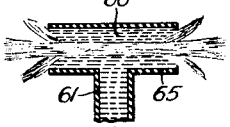
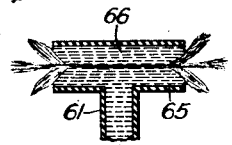
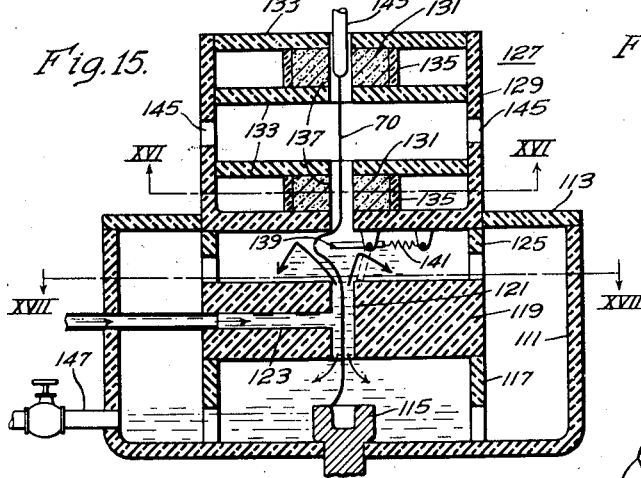
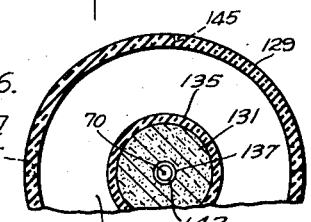
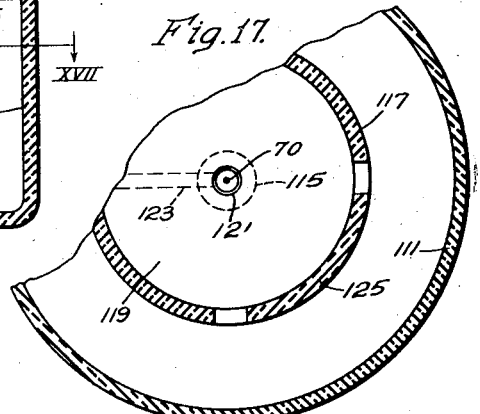
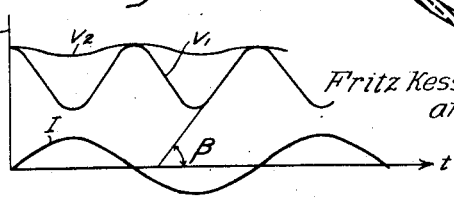
INVENTORS.
Fritz Kesselring, Floris Koppelmann
and Werner Kaufmann.

Patented May 18, 1937

2,080,612

UNITED STATES PATENT OFFICE 2,080,612

CIRCUIT BREAKER

Fritz Kesselring, Berlin-Hermsdorf, and Floris Koppelmann and Werner Kaufmann, Berlin-Siemensstadt, Germany, assignors to Westinghouse Electric & Manufacturing Company, East Pittsburgh, Pa., a corporation of Pennsylvania Application February 2, 1934, Serial No. 709,458
In Germany February 3, 1933

6 Claims. (Cl. 200—144)

Our invention relates to circuit interrupters and particularly to arc extinguishing devices for high voltage circuit breakers.

Arc extinction has in recent years become one of the most important and at the same time most troublesome problems encountered in the electrical art, the principal reasons for this being the constant demand by power companies for higher voltage transmission circuits, and the increasing tendency of those companies to interconnect their systems. The combined effects of these is to increase the available power in the circuits which must be interrupted, to increase the difficulty of opening the circuits due to the high arc voltage, and to impose the further requirement that fault conditions must be cleared within a very short period of time in order to prevent damage to the connected equipment. Numerous circuit interrupting devices have been used with more or less success, but there is still much to be desired, particularly in the securing of high speed interruption of the higher voltage circuits.

It is an object of our invention, therefore, to provide an improved circuit interrupter that shall be capable of interrupting large amounts of power at high voltage, with a shorter arcing time than has been heretofore considered necessary, and with less disturbance to the interconnected systems than has heretofore been common practice.

Another object of our invention is to provide a circuit interrupter of the type described above which shall utilize a minimum number of moving parts and which shall be relatively inexpensive to manufacture.

In accomplishing these objects of our invention, we prefer to employ one of two alternative methods. The simpler of these methods consists in the provision of an improved circuit breaker of the so called jet type wherein the arc incident to the separation of the current carrying contacts is extinguished by means of a flowing jet of fluid which surrounds at least a considerable portion of the arc. While the general principle of operation of these circuit breakers is, of course, not new, many of their operational characteristics have not, prior to our invention, been carefully investigated, and we have discovered several important structural arrangements which add much to the reliability and safety of operation of those devices.

One of the most important of these structural arrangements is the provision of means for causing the flow of the arc extinguishing fluid through the jet passage to be initiated before the arc is drawn into that passage. This assures the effective use of the complete length of the jet passage, and in addition facilitates the establishing of the full rate of flow, due to the absence of gaseous or other arc products from the passage.

Heretofore, it has been customary to guide the arc and the stream of fluid in a common passage. With this arrangement, the fluid follows the arc into the passage, and the lengthening arc is not continuously surrounded with a fully established flowing stream of extinguishing fluid, as is the case in the structure of our invention. As a result, the prior structures have had to utilize much higher pressures in the supply source for the extinguishing fluid, and have not operated with a maximum of effectiveness.

The second preferred method of accomplishing the objects of our invention consists in the provision of a circuit breaker in conjunction with a device for inserting impedance into the arc circuit during the interruption operation so as to facilitate the extinction of the arc. The specific device which we prefer to utilize for accomplishing this insertion of impedance into the arc circuit is similar to a jet type circuit breaker but, as will be described later, utilizes a semi-conducting fluid and differs therefrom in its structural features.

In addition to the hereinbefore stated objects of our invention, it is an ancillary object of our invention to provide an improved circuit interrupter which shall include means integral therewith for simultaneously limiting the arc current and subjecting the portion of the arc to a blast of gas to effect its extinguishment.

For a better understanding of the objects of our invention and the preferred method of accomplishing those objects, reference may be had to the following drawings and specification, wherein Figure 1 is a schematic view of a circuit interrupting system wherein are embodied the principal elements of our invention;

Fig. 2 is a sectional view of one form of jet chamber which may be used in conjunction with the circuit interrupting system shown in Fig. 1;

Fig. 3 is a sectional view taken on the line III—III of the jet chamber shown in Fig. 2;

Figs. 4, 5, 6, 7, 8, and 9 are sectional views similar to Figs. 2 and 3 showing various modified forms of jet chambers suitable for use with the circuit interrupting system shown in Fig. 1;

Fig. 10 is a sectional view similar to Fig. 2 showing a jet chamber suitable for use with circuit breakers wherein the arcing contact moves vertically to open and to close the circuit.

Fig. 11 is a sectional view taken on the line XI—XI of Fig. 10;

Figs. 12, 13 and 14 are sectional views showing the various stages in the extinction of an arc within a jet chamber constructed according to our invention;

Fig. 15 is a sectional view through a circuit interrupter which utilizes a jet chamber for inserting resistance into the circuit to decrease the magnitude of the arc current and means for subjecting a portion of the arc to a longitudinal gas blast simultaneously with the limiting of the current.

Figs. 16 and 17 are sectional views taken on the lines XVI—XVI and XVII—XVII of Fig. 15, and Fig. 18 is a graphical representation of the fluid pressure conditions within jet devices which are, and which are not, provided with pressure equalizing means.

The circuit interrupting system shown in Fig. 1 comprises a source of power, indicated by the line 1; an oil circuit breaker 3 of the conventional single pole double break type which may or may not be used depending on whether the short circuiting switch 5 is open or closed; a jet chamber device 7 which may be used either as a circuit interrupter or as a means for inserting resistance into the electrical circuit of which it forms a part; an overload relay 9 connected in current responsive relation with the system; a solenoid operating mechanism 11 for moving the contact rod 13 of the jet chamber device from the closed circuit position to which it is normally biased by a spring 15 to the open circuit position; a pressure chamber 17 which is partially filled with a liquid 19, for supplying fluid to the jet chamber device 7; an electromagnetically operated valve 21 for preventing flow of the liquid from the storage chamber 17 to the jet chamber device 7 except during the operation of that device; a pressure cylinder 23 for supplying pressure to the storage chamber 17; and a centrifugal pump device 25 for returning the jet liquid 19 to the storage chamber 17. The oil circuit breaker 3 includes a pair of fixed contacts 27 which are adapted to be connected by a movable bridging bar 29 supported upon the actuating rod 31. Any suitable operating mechanism may be utilized for moving the rod 31, and with it the bridging bar 29, to the open or to the closed circuit positions.

The jet chamber device 7 includes a cylindrical outer casing 33 which is preferably of insulating material, an annular member 34 of insulating material for defining the jet passage, and a pair of insulators 35 which are adapted to be supported by suitable means (not shown) at either end of the outer casing 33 and which extend some distance into the space within the casing. A cylindrical rod 37 of conducting material extends through the left hand insulator 35 and is provided at its inner end with a contact portion 39 adapted to engage the one end of the movable contact rod 13 to complete the electrical circuit through the device. The contact rod 13 is adapted to be slidably supported by the other insulator 35 and is provided at its outer end with an armature 41 of magnetic material. A collar 43 is utilized for completing the electrical circuit from the movable contact rod 13 to the other line 45.

The armature 41 engages and is adapted to slide within a suitably proportioned guide tube 47 about which is disposed the armature attracting coil 49. The coil spring 15 disposed within the insulating cylinder serves, as mentioned previously, to bias the contact rod 13 into engagement with the stationary contact 39.

The overload relay 9 which is used for causing the actuation of the jet device may be of any of the well known forms. As shown schematically in Fig. 1, the device includes an energizing coil 51 connected in series with the electrical circuit through the jet chamber device 7, and a movable armature 53 adapted to be attracted by the coil 51 so as to complete the electrical circuit between the contact points 55 and 57. The armature 53 is biased to the unattracted position by a suitable spring 59.

The structural features of the electrically operated valve 21 are not important for the purposes of this invention, and any suitable device which will normally close the conduit 61 leading from the pressure chamber 17 to the interior of the jet device 7 may be utilized. It is necessary, however, that the electrically operative valve be capable of very rapid operation immediately following the energization of its control circuit, and that there will be no danger of the device failing to operate under abnormal conditions. For most satisfactory operation, the valve 21 should reclose as soon as the control circuit has been opened. The coil 49 which is employed for attracting the contact rod armature 41 and the electrically operated valve 21 are connected in parallel and are adapted to be energized upon the actuation of the overload relay 9 which moves to connect the battery 63 in the circuit of the valve and the attracting coil.

A substantial portion of the path of movement of the contact rod 13 is enclosed by the annular member 34 (shown particularly in Fig. 2) which is provided with a suitable tubular opening or passage 65 in the central portion thereof. This tubular passage 65 comprises the jet chamber, and it is adapted to be connected with the source of supply of the jet liquid 19 (the pressure chamber 17) by means of the conduit 61 which cooperates with a suitable passageway 67 disposed in the wall of the member 34 which defines the chamber. During the operation of the jet device 7, the electrically operated valve 21 opens substantially at the same instant that the moving contact rod 13 is caused to disengage the stationary contact 39 as a result of the energizing of the attracting coil 49. Thus, the jet passage 65 within the member 34 is filled with fluid at all times during the operation of the device. The cross sectional area of the jet passage is somewhat larger than the area of the moving contact in order that the flow of liquid may be initiated before or during the disengaging of the stationary contact 39 by the moving contact rod 13. The liquid which flows through the jet passage 65 during the operation of the device may be restored to the pressure chamber 17 by means of the centrifugal pump indicated schematically at 25. Pressure within the storage chamber 17 is maintained by the cylinder 23 of compressed air or other suitable gas which is connected thereto through a reducing valve 69.

Having thus described the general structural features of one embodiment of our invention, we shall describe its operation as a circuit breaker for use particularly with alternating current circuits. When the jet device is being so used, the switch 5 is normally closed thus removing the circuit breaker 3 from the circuit. Upon the occurrence of predetermined overload conditions, the relay 9 moves so as to cause the energizing of the electrically operated valve 21 and the attracting solenoid 49. One immediate result of this is to cause a portion of the liquid 19 which is retained under pressure in the storage chamber 17 to flow through the jet passage 65 within the member 34. At the same time the contact rod 13 is being moved through the jet passage 65 to the open circuit position as a result of the attraction of the armature 41 by solenoid 49. The outflowing fluid is under sufficient pressure that it entirely surrounds the arc as is shown in Fig. 12 in which figure the arc current is assumed to be at a maximum. As the arc current decreases toward the current zero point—the interruption of the alternating current circuit being assumed—the action of the outflowing jet is to effect a throttling of the arc similar to that shown in Figs. 13 and 14 and as the arc passes through the zero point, the core of ionized gas and fluid which heretofore had provided the conducting path through the jet chamber is replaced by fresh un-ionized fluid. Thus when the voltage again builds up, the arc will not re-ignite due to the fact that a cylindrical slug of insulating liquid having the dimensions of the jet passage 65 has been interposed between the two contact members.

The extinguishing of the arc depends on the length of the slug of insulating fluid which is inserted in the jet passage during each current zero. The length of this is, of course, dependent upon the position of the moving contact rod 13 and the maximum effectiveness of the interrupter is reached when that rod 13 has been moved entirely out of the jet passage 65. Thus, if the arc is to be extinguished in the minimum possible time, it is imperative that the jet chamber be filled with liquid within a period of time not greater than a fraction of one alternation of the arc current, and it is equally important that the contact rod 13 disengage the stationary contact 39 at high speed, in order that the length of the arc at the first zero point shall be as large as is possible. For ordinary overload values, the arc is usually extinguished upon the first zero point, the movement of the contact rod being sufficiently rapid to cause a substantial disengagement of the cooperating contact surfaces during the first half cycle. Upon the occurrence of very severe overloads, however, or during the interrupting of fault conditions, when the power factor is very low, it is usually necessary for the moving contact rod to completely disengage the jet passage. The solenoid mechanism may be adjusted to effect this within not more than two or three half cycles, and arc extinction within that time is satisfactory for most present day circuits.

In Figures 12, 13, and 14, the jet passage is indicated at 65, and the inlet passage for the jet liquid at 61. The inlet passage terminates at the mid point of the jet passage, and that passage is open at either end, similar to the structures shown in the other figures of the drawings. The three figures show the arc extinguishing or quenching operation at three different time instants, the time interval between the respective figures being about .005 second. Figure 14 shows the arc when the current is zero, while Figures 12 and 13 show the arc shortly before the zero point is reached. The current for the condition illustrated in Figure 12 might be 3000 amperes, and for the condition illustrated in Figure 13 1500 amperes (a 50 cycle source being assumed).

Just before the arc is drawn into the jet passage 65, the jet liquid is forced into that passage through the inlet 61. The arc, as is shown in Figure 12, is thus surrounded by a tubular mantle or casing 66 of liquid which is under pressure and which closely surrounds that portion of the arc located within the jet passage 65. The arc vaporizes the layer of liquid directly engaging it, and thereby causes the arc core to be surrounded by a casing of vapor which is interposed between the arc and the main body of the surrounding liquid. Both the surrounding liquid and vapor are, however, moving at high speed, axially of the arc due to the large difference of pressure existing between the midpoint of the passage 65 and the open ends thereof. Thus, the liquid forced into and through the inlet 61 replaces the outflowing liquid and gases, substantially instantly, so that fresh liquid is caused to intimately contact the arc at all times, despite the rapid decrease in its cross sectional area which accompanies the normal current wave fluctuations of the arc current. It is evident that it is as necessary to ensure a free outflow of the gases and liquid from the jet passage 65, as it is to provide a sufficiently high pressure at the liquid supply source to overcome the back pressure of the gases formed within the jet passage by the arc.

In Figure 13, the decreasing arc current has permitted the jet passage 65 to be filled with the outflowing fluid for a considerable portion of its diameter, and in Figure 14, the arc is shown as having contracted to a very thin stringlike shape. This great decrease in the arc diameter as compared with the dimensions of the surrounding mantle of flowing fluid produces a very high temperature drop at the arc surfaces in contact with the flowing liquid, due to the large thermal capacity of the fluid. Therefore, the temperature of the core of ionized fluid which constitutes the arc drop, during the effective period of current zero (which may last about .00001 to .0001 second, for a 50 cycle circuit), at a very rapid rate in so doing prevents the arc from restriking.

Tests were made on a jet device, constructed according to our invention, having a jet passage 49 millimeters long. It was found that with a fluid pressure of 10 atmospheres on the jet fluid (distilled water) and with the ends of the passage open to the atmosphere, that a circuit capable of delivering 8000 amperes (effective) at 15000 volts (effective) could be extinguished at the first zero point in the current wave. The voltage per centimeter length of the jet passage was thus about 3000 volts, a value which has heretofore been unattainable in devices for quenching high current arcs.

The effectiveness of operation of this type of circuit interrupter depends to a great extent, as mentioned above, upon the fact that the gasified portions of the fluid which are formed by the arc are immediately carried away by the outflowing stream of cool fluid. This prevents the formation of the usual gas bubbles which is incident to the operation of most fluid type circuit breakers, and since such gas bubbles are invariably filled with highly ionized gas, the interruption of the circuit is greatly simplified by their removal from the arc passage.

We have found that the dimensions of the jet chamber, the speed of movement of the moving contact rod, and the pressure at which the extinguishing fluid is introduced into the chamber are all of considerable importance, and if the interrupter is to operate with maximum effectiveness they must be carefully correlated, one with the other, for various conditions of voltage and available circuit power. The length of the jet chamber must be sufficient to prevent re-ignition of the arc, due to insulation and, at the same time, to utilize the full length of the chamber breakdown, the pressure exerted by the outflowing jet fluid upon the arc must not decrease materially throughout the entire length of the jet passage. To assure the maintaining of this pressure along the jet chamber, we have found it necessary to utilize pressures within the chamber 17 of the order of 2 to 20 atmospheres, the open ends of the jet chamber being at atmospheric pressure. The cross section of the jet passage 65 may be made round as is shown in the preferred embodiment of our invention, or it may be made elliptical or rectangular. We have found, however, that it is difficult, if, in fact, not impossible, to secure satisfactory operation of the device when using a circular jet passage having a diameter greater than 14 millimeters. Similar proportions would, of course, prevail for passages which were not circular in cross section.

When the jet device is being used as a circuit interrupter, it is desirable to employ a fluid having the highest possible insulating value. Oil is a suitable fluid, and, if desired, the pressure cylinder 23 may be filled with an inert gas in order to prevent oxidation and deterioration of the oil within the pressure chamber 17 when the interrupter stands idle for a considerable period of time. The use of distilled water has been previously mentioned.

In the device illustrated in Fig. 1, the moving contact 13 would be automatically restored to the closed circuit position by the spring 15 shortly following the extinction of the arc due to the removal of the energizing force from the overload relay 9. It is possible, however, and within the scope of our invention that the moving contact means could be latched in the open circuit position following each interrupting operation.

In the foregoing description of the operation of our jet type circuit interrupter, it has been assumed that the device was connected in an alternating current circuit. The interrupter may, of course, be utilized for interrupting direct current circuits, provided that the rate of flow and the pressure of the fluid within the jet chamber are properly correlated with regard to the dimensions of the chamber and the circuit constants.

It was pointed out in the objects of our invention that the jet device 7 could be used not only for interrupting a circuit but also for introducing resistance into an electrical circuit in order to facilitate the extinction of an arc drawn externally of the jet chamber. When the device is used in this manner, the liquid in the storage chamber is necessarily of a semi-conducting nature, and it is not possible to completely interrupt the circuit within the jet chamber itself. Thus, when the jet chamber is used for limited arc current, it is necessary to employ a second interrupter for performing the actual arc extinction, or, as we will describe later, auxiliary means may be provided for causing an extinction of a portion of the arc which is acted upon by the jet device itself.

Various semi-conducting fluids such as water solutions may be successfully employed as the jet liquid. The specific resistance of the jet liquid must be properly correlated with the other constants of the apparatus and the circuit, and to minimize the danger of the arc restriking the jet liquid should have as high thermal capacity as possible.

In the operation of the jet device 7 as a resistance inserting means for limiting the arc current, the switch 5 is open. Upon the occurrence of predetermined conditions, the overload relay 9 is actuated, thereby causing the operation of the electrically operated valve 21 and the solenoid actuating means 11 for the moving contact 13. As in the previously described case, the arc is drawn within the jet passage 65 which is filled with a quantity of outflowing fluid 19, previously contained in the storage chamber 17. The action within the jet passage 65 is, in this case, somewhat different, due to the fact that the outflowing fluid which surrounds the arc, being semi-conducting in nature, serves to place a conducting circuit in parallel with the arc itself. As the arc approaches the zero point in the current wave it is extinguished, because of the conducting path in parallel therewith, and it does not ever restrike because the current in the circuit flows through the conducting plug formed by the outflowing liquid within the jet passage 65. If this liquid were not flowing continuously, the internal $I^2R$ loss would, of course, immediately result in its volatilization with the subsequent reformation of the arc. However, it is outflowing and by constantly bringing cool liquid into the jet passage 65 restriking of the arc is prevented, and at the same time, due to the inherent resistance of the liquid, the magnitude of the arc current is very materially limited.

The actuating means for the oil circuit breaker 3 may be adjusted to cause the separation of the cooperating contacts 27 and 29 either before or after the insertion of the resistance into the arc circuit by the actuation of the jet device 7, preferably the operation takes place substantially simultaneously in order to limit the time of interrupting the circuit as much as possible. It is immediately apparent that the introduction of the resistance into the arc circuit by the jet device 7 serves to materally limit the current which can flow through the arc established in the oil circuit breaker 3, and thus greatly facilitates the interruption of the circuit by that breaker. This arrangement is especially suitable for use with very high speed circuits which are interconnected so as to make available extremely large amounts of power, because by the use of jet devices it is possible to employ circuit breakers of considerably smaller rating than the maximum possible fault power.

In Figs. 4 to 9, inclusive, we have illustrated certain modified forms of the jet chamber which are particularly suitable for some applications. The structure shown in Figs. 4 and 5 is essentially similar to that shown in Figs. 2 and 3 except that the inlet passage 81 connects with an annular cutout portion 83 disposed at the center of the jet passage 85. This annular cutout portion 83 permits the inflowing fluid to more readily surround the moving contact rod 13 when it extends through the jet passage (that is, when it is in the closed circuit position), and at the same time permits the outflowing fluid to engage the arc surface more or less radially thereto. Considerably improved operation has been noted during the interruption of the higher current arcs.

The jet chamber illustrated in Figs. 6 and 7 is structurally similar to that shown in Figs. 2 and 3 except for the fact that a cushioning or energy storage chamber 87 has been added thereto. We have found that much more satisfactory operation of the jet device 7 will result, especially at higher current values, if some cushioning means is provided for equalizing the pressure within the jet passage to assure that the outflowing liquid will be held in intimate contact with the arc as the current decreases toward the zero point. During this decrease, as is shown schematically in Figs. 12, 13, and 14, the cross sectional area of the arc decreases likewise, usually very rapidly, and under certain conditions, it is extremely difficult (unless excessively high pressures are employed in the storage chamber), due to the fluid friction and inertia existing in the pressure supply system, for sufficient liquid to be introduced into the jet passage 89 to assure an intimate contacting of the arc, at all times. If, however, a cushioning chamber, such as that shown in Figs. 6 and 7, is provided, gas will be entrapped in this chamber and during the operation of the device, it will provide an energy storage means which has very little inertia and which is capable of maintaining the outflowing fluid within the jet passage under sufficient pressure to assure intimate contact between the arc and the liquid while the arc is decreasing in magnitude. Obviously, the natural frequency of oscillation of the cushioning chamber should not be less than twice the normal frequency of the arc.

Figure 18 shows the pressure conditions within the jet passage, during the time the arc exists therein, both for devices which are provided with low inertia energy storage means for equalizing the internal pressure, and for devices which are not so equipped. Time is shown on the horizontal axis. I represents the arc current, $V_1$ represents the entering speed of the fluid in the jet passage without any equalization, and $V_2$ represents the speed of the fluid with equalization. The tangent of the angle $\beta$ is proportional to the accelerating force which must be applied to the fluid (i. e. the pressure within the storage chamber), and it is immediately obvious that this force can be greatly reduced by a proper equalizing device.

The jet chamber illustrated in Figs. 8 and 9 is particularly intended for use with high voltage circuits. The walls 90 of the chamber are provided with three annular cutout portions 91 which are adapted to cooperate with a reservoir chamber 93 formed in the lower portion of the jet chamber walls. The normal direction of fluid flow is shown by the arrows and we have found the arrangement most satisfactory in operation.

In Figs. 10 and 11, we have illustrated a form of jet chamber which is particularly intended for use with devices wherein the contact rod 13 moves vertically. A pair of annular baffles 97 are formed in the walls 95 of the chamber, and these baffles are provided with suitable openings 99 in order to permit the flow of the liquid therethrough. The jet passage 101 terminates in two funnel shaped openings 103. The upper portion of the chamber is formed with an annular opening 104 therein in order to permit the entrapment of gas during the operation of the device. This arrangement results in the equalized pressure which was described in conjunction with the structure shown in Figs. 6 and 7, and in combination with the other novel structural features adds much to the reliability of operation of the device.

The jet chambers of our invention may be machined or otherwise formed from any suitable insulating material such as fibre, or they may be molded from any of the plastic molded materials now in common use. This latter method is one which we have found very satisfactory in carrying out the objects of our invention, the several portions of the jet chambers being formed as individual annular shaped members which are bolted or otherwise securely fastened together to form the completed structure. In all of the figures of the drawings of the jet chambers, the normal direction of fluid flow has been indicated by arrows and the arc by the line 70.

In Figs. 15, 16, and 17, we have illustrated a circuit interrupter which utilizes the above described jet principle to limit the maximum value of the arc current and which also utilizes means for producing a longitudinal blast of gas in order to extinguish that portion of the arc which still exists after the jet device has actuated to introduce impedance in the electrical circuit thereof. In effect, this modification of our invention consists of a long arc passage part of which is defined by a jet device and the other part of which is defined by gas producing means such as boric acid or the like.

The base of the interrupter comprises a cylindrical member 111 of insulating material which is provided with a removable cover 113 likewise of insulating material. A stationary contact member 115 is affixed to the central portion of the base member 111, and a cylindrical tube 117 of insulating material is likewise secured to this base portion for supporting the annular member 119 of insulating material. This annular member is provided with a centrally disposed opening for defining the jet passage 121 and, in addition, is provided with a suitable opening 123 for permitting the semi-conducting fluid to be introduced into the device. A second tubular member 125 is disposed above the annular member 119 and this serves to support the gas producing portion 127 of the interrupter.

The gas producing portion 127 comprises, as is shown particularly in Fig. 16, a cylindrical outer casing 129 wherein are supported two annular members 131 of compressed boric acid or of fiber. These annular members 131 of gas generating material are held in position by means of suitable plates 133 and tubes 135 of insulating material, and are provided with a centrally disposed opening 137 of substantially the same diameter as the jet passage 121. In the completed structure the openings 137 are arranged so as to form a continuation of the jet passage 121. Upon the lower side of the casing 129 for the gas produced means, there is disposed a pivotally mounted flap valve 139 which is biased to the position shown in full lines in Fig. 15 by a suitable spring 141. When the moving contact rod 143 is moved to the closed circuit position, it is adapted to engage this flap valve 139 and move it to the position shown in dotted lines in Fig. 15. As the rod 143 moves to the open circuit position, however, the flap valve 139 is restored to its normal position by the spring 141, in which position it serves as a baffle for preventing the outflowing liquid from the jet passage from being introduced into the passage 137 within the gas producing portion 127 of the extinguisher.

The operation of this modification of our invention is essentially as follows: Upon the occurrence of a predetermined overload or short circuit condition, the actuating mechanism of the breaker begins to move the contact rod 143 from a position where it engages the stationary contact 115 toward the open circuit position. At the same time, the means for supplying the semi-conducting liquid, to the jet device is put in operation and that liquid flows around the moving contact rod. An arc is, of course, immediately established between the stationary contact 115 and the lower end of the moving contact 143. As soon as the lower end of the moving contact rod moves through the jet passage 121, that portion of the arc within the jet passage is extinguished, due to the conducting nature of the surrounding fluid flowing therein. A portion of the arc will, however, exist above the jet passage and, inasmuch as the contact rod 143 is progressively moving away from the jet passage 121 toward the open circuit position that arc will be drawn into the passage 137 defined by the boric acid members 131.

The proximity of the arc to the boric acid walls which line the upper portion of the arc passage 137 will result in the production of an outflowing blast of water vapor which will vent through the openings 145. This outflowing blast of gas will, of necessity, flow through the arc longitudinally, and, since the maximum current of the arc is definitely limited by the impedance which has been inserted in the circuit due to the operation of the jet device, its extinguishment will take place within a very short period of time. This form of circuit interrupter is especially suitable for interrupting very high voltage circuits wherein insulation problems make it necessary to prevent the semi-conducting fluid utilized in the jet device from contacting any more of the arc passage than is absolutely necessary. Such fluid as may collect in the base of the circuit interrupter may be returned to the pressure reservoir by means associated with the conduit 147.

From the above it will be seen that we have disclosed a novel form of fluid jet device which may be used either as a circuit interrupter or as a means for introducing resistance into an electrical circuit. When the jet device according to our invention is used as a circuit interrupter an insulating liquid is employed within the jet passage, and when the device is used as a means for inserting resistance into an electrical circuit a semi-conducting liquid is employed within the jet passage. Moreover, we have disclosed the structural features of a number of specific types of jet chambers which were not heretofore known to the art.

We have also disclosed a novel circuit interrupter which includes means integral therewith for simultaneously limiting the arc current through a jet device and for extinguishing the arc by causing a blast of arc extinguishing gas to flow longitudinally therethrough.

While, in accordance with the patent statutes, we have disclosed the foregoing details of certain preferred embodiments of our invention, it is to be understood that many of the details are but illustrative, and that variations in their precise form will be both desirable and necessary in certain applications. It is our desire, therefore, that the language of the accompanying claims shall be accorded the broadest reasonable construction, and that our invention shall be limited only by what is explicitly stated therein and by the prior art.

We claim the following as our invention:

1. In a circuit interrupter; an arc passage, one portion of which is defined by solid means capable of liberating an arc extinguishing gas when brought into contact with an electric arc, and another portion of which is defined by a jet device; and means for establishing an arc within said passage; said jet device including means for filling that portion of said arc passage which is defined thereby with a flowing stream of semi-conducting liquid, in order to limit the arc current; the portion of said arc passage which is defined by solid gas evolving means causing said arc to be subjected to a longitudinal blast of arc extinguishing gas to effect its extinguishment.

2. In a circuit interrupter; an arc passage, one portion of which is defined by solid means capable of liberating an arc extinguishing gas when brought into contact with an electric arc, and another portion of which is defined by a jet device; means including a contact rod movable through said passage for establishing an arc therein; said jet device including means for filling that portion of said arc passage which is defined thereby with a flowing stream of semi-conducting liquid, in order to limit the arc current; the portion of said arc passage which is defined by solid gas evolving means causing said arc to be subjected to a longitudinal blast of arc extinguishing gas to effect its extinguishment; and means operable in response to the movement of said contact rod to prevent said semi-conducting liquid from flowing into the gas evolving portion of said passage.

3. In a device for inserting resistance into an alternating-current electrical circuit, means for defining the walls of a tubular arc passage, means for drawing an arc within said passage, a body of semi-conducting liquid, means for introducing a quantity of said liquid into said passage under sufficient pressure to cause at least a portion of said arc to be surrounded by a flowing stream of said liquid which is in intimate contact therewith, and low inertia energy storage means for preventing the normal fluctuations in the magnitude of the arc current from causing sufficient fluctuation in the pressure within said passage to permit the said intimate contact between said arc and said liquid to be broken, the natural period of oscillation of said energy storage means being not substantially less than twice the frequency of the alternating-current circuit with which said apparatus is used, the specific conductivity of said liquid being sufficiently high that the portion of said arc which is in contact with said liquid during the operation of said device is extinguished due, at least in part, to the conductive effect of said liquid.

4. In a device for inserting resistance into an alternating-current electrical circuit, means for defining the walls of a tubular arc passage having a length at least several times its greatest cross-sectional dimension, means for establishing an arc longitudinally of said passage, a body of semi-conducting liquid, means, including a conduit, which connects with said passage intermediate its ends, and a source of compressed gas, for moving a quantity of said liquid into said passage during and only during each operation of said device, said arc passage being open at either end, and except for said conduit means, being otherwise completely closed, said quantity of liquid being moved into said passage under sufficient pressure to cause said arc to be surrounded by a flowing stream of said liquid which is in intimate contact therewith, the specific conductivity of said liquid being sufficiently high that the portion of said arc which is in contact with said liquid during the operation of said device is extinguished, and low inertia energy storage means for preventing the normal fluctuations in the magnitude of the arc current from causing sufficient fluctuation in the pressure within said passage to permit the said intimate contact between said arc and said liquid to be broken, the natural period of oscillation of said energy storage means being not substantially less than twice the frequency of the alternating-current circuit with which said apparatus is used.

5. In a circuit interrupter, means for defining the walls of an arc passage one portion of which comprises a gas blast chamber and another portion of which comprises a jet chamber, a body of arc extinguishing liquid, means for drawing the arc incident to each opening operation within said arc passage, one portion of said arc being drawn within each of said chambers, means actuable during each operation of said interrupter to subject that portion of said arc which is drawn within said jet chamber to a flowing jet of said arc extinguishing liquid, and means for subjecting that portion of said arc which is drawn within said gas blast chamber to a blast of arc extinguishing gas derived from a source other than said arc extinguishing liquid.

6. In a circuit interrupter, means for defining the walls of an arc passage one portion of which comprises a gas blast chamber and another portion of which comprises a jet chamber, at least a portion of the walls of said gas blast chamber consisting of solid means which is capable of liberating an arc extinguishing gas when brought into contact with an electric arc, means for drawing the arc incident to each opening operation of said interrupter within said arc passage, one portion of said arc being drawn within each of said chambers, a body of arc extinguishing liquid, and means actuable during each operation of said interrupter to subject that portion of said arc which is drawn within said jet chamber to a jet of arc extinguishing liquid, the portion of said arc which is drawn within said gas blast chamber being subjected to the arc extinguishing action of the gas which is evolved from said solid means.

FRITZ KESSELRING.
FLORIS KOPPELMANN.
WERNER KAUFMANN.